(12) United States Patent
Diggins et al.

(10) Patent No.: US 11,516,429 B2
(45) Date of Patent: Nov. 29, 2022

(54) SYSTEM AND METHOD FOR IMAGE FORMAT CONVERSION USING 3D LOOKUP TABLE APPROXIMATION

(71) Applicant: GRASS VALLEY LIMITED, Newbury (GB)

(72) Inventors: Jonathan Diggins, Havant (GB); Charles S. Meyer, Crystal Bay, NV (US); Stephen Ives, Little Chesterford (GB)

(73) Assignee: GRASS VALLEY LIMITED, Newbury (GB)

( * ) Notice: Subject to any disclaimer, the term of this patent is extended or adjusted under 35 U.S.C. 154(b) by 0 days.

(21) Appl. No.: 17/229,280

(22) Filed: Apr. 13, 2021

(65) Prior Publication Data

US 2021/0337163 A1 Oct. 28, 2021

Related U.S. Application Data

(60) Provisional application No. 63/013,967, filed on Apr. 22, 2020.

(51) Int. Cl.
*H04N 7/01* (2006.01)
*H04N 9/64* (2006.01)

(52) U.S. Cl.
CPC ............... *H04N 7/01* (2013.01); *H04N 9/64* (2013.01)

(58) Field of Classification Search
CPC .. H04N 7/01; H04N 9/64; H04N 5/20; H04N 9/67; H04N 19/126; H04N 19/186;
(Continued)

(56) References Cited

U.S. PATENT DOCUMENTS 6,097,437 A * 8/2000 Hwang ............... G09G 5/005
345/603
6,348,940 B1 * 2/2002 Sano ............... H04N 1/00132
358/302

(Continued)

FOREIGN PATENT DOCUMENTS

| WO | 2014204865 A1 | 12/2014 |
| WO | 2015065890 A1 | 7/2015 |
| WO | 2016153896 A1 | 9/2016 |

OTHER PUBLICATIONS

International Search Report and Written Opinion of the International Searching Authority received in PCT/GB2021/050977; dated Jul. 20, 2021.

(Continued)

*Primary Examiner* — Paulos M Natnael
(74) *Attorney, Agent, or Firm* — ArentFox Schiff LLP

(57) ABSTRACT

A system is provided for converting image data from a first image format to a second image format that approximates a three-dimensional lookup table. The system includes an image processing operation database that stores image format conversion configurations; an image format conversion selector that selects an image format conversion for converting the image data from a first to a second format and that accesses, from the database, a corresponding image format conversion configuration for converting the image data to the second format; and an image processor that executes processing input operations on RGB components of the image data, a 3×3 matrix, and processing output operations on the respective RGB components that are output from the 3×3 matrix, such that the image data is converted to the second format, with the processing input and output operations comprising the accessed image format conversion configuration.

18 Claims, 9 Drawing Sheets

(58) Field of Classification Search
CPC ...... H04N 19/85; H04N 11/20; H04N 19/136; H04N 19/192; G06T 1/00
See application file for complete search history.

(56) References Cited

U.S. PATENT DOCUMENTS

| | | | |
|---|---|---|---|
| 6,518,970 B1* | 2/2003 | Glen | H04N 9/641 348/E5.009 |
| 6,791,620 B1* | 9/2004 | Elswick | H04N 7/106 348/E7.003 |
| 8,670,001 B2* | 3/2014 | Comer | G06T 3/0018 345/647 |
| 2001/0017890 A1* | 8/2001 | Rhee | H04N 7/014 348/700 |
| 2005/0210125 A1* | 9/2005 | Li | H04L 43/16 709/219 |
| 2008/0129723 A1* | 6/2008 | Comer | G06T 3/0018 345/619 |
| 2015/0054978 A1* | 2/2015 | Shibagami | G06T 7/12 348/222.1 |

OTHER PUBLICATIONS

Philippe Bordes et al, "AHG14: Color Gamut Scalable Video Coding using 3D LUT", 13. JCT-VC Meeting; 104. MPEG Meeting; Apr. 18, 2013-Apr. 26, 2013; Joint Collaborative Team on Video Coding of ISO/IEC JTC1/SC29/WG11 and ITU-T SG.16.
Zicong Mai et al, "Optimizing a Tone Curve for Backward-Compatible High Dynamic Range Image and Video Compression", IEEE Transactions on Image Processing, Jun. 1, 2011, pp. 1558-1571, vol. 20 No. 6, Iee Service Center, Piscataway, NJ, US.

* cited by examiner $$\underbrace{(input\ LUT)^{\alpha}}_{\substack{standard\\curve}} \times gain_{in} \rightarrow \underbrace{3 \times 3}_{\substack{standard\\colour\\conversion}} \rightarrow \underbrace{(output\ LUT)^{\beta}}_{\substack{standard\\curve}} \times gain_{out}$$

SYSTEM AND METHOD FOR IMAGE FORMAT CONVERSION USING 3D LOOKUP TABLE APPROXIMATION

CROSS REFERENCE TO RELATED APPLICATIONS

The current application claims priority to U.S. Provisional Application No. 63/013,967, filed Apr. 22, 2020, the entire contents of which are hereby incorporated by reference.

TECHNICAL FIELD

The present disclosure relates generally to image format conversion of video data, and, more particularly, to a system and method for approximating a three-dimensional lookup table for image format conversion.

BACKGROUND

In general, several forms of color space models exist within the television industry so as to properly represent and reproduce color in a physical device supporting a given color space model. For example, some of these models include Red, Green, Blue (RGB), YPbPr, ITU-R Recommendation BT.709, and ITU-R Recommendation BT.2020. Dynamic range is another aspect of brightness and color which has several forms including Standard Dynamic Range (SDR) and High Dynamic Range (HDR), which, in itself, is subject to various forms including, and not limited to, Perceptual Quantizer (PQ), HDR10, and Hybrid Log-Gamma (HLG). These dynamic range standards use different luminance curves.

In many instances, there is a need to convert between color space and/or dynamic range models. FIG. 1 illustrates a high-level block diagram of a system for converting image data from a first format "a" to a second format "b", which could be, for example, a conversion from HDR to SDR. As generally shown, the system is configured to convert scene light to display light. Scene light can be considered the raw data captured by the sensors of the camera, i.e., it is linear raw data that is a true representation of the actual light levels in the scene (e.g., a sporting event or news broadcast). As such, image conversion processes must be used to convert this linear raw data to display data, which is formatted (e.g., as part of the gamma process) so that the images on the screen look natural to the consumer.

As shown, received scene light in a first format "a" will be applied to an opto-electronic transfer function ("OETF") 2A that maps the linear scene light in format "a" into a non-linear signal value. This converted light will then be applied to electro-optical transfer function ("EOTF") 4A that maps the non-linear signal value into display light to be displayed on a display device (e.g., a television) in the same format "a", but as display data. As also shown, an OETF 2B maps the linear scene light in format "b" into a non-linear signal value, which is then applied to EOTF 4B that maps the non-linear signal value into display light to be displayed in format "b". As further shown, to convert the image data from format "a" to format "b", the non-linear signal value output from OETF 2A is processed/converted (as described in more detail below) and then converted back to the electrical/video code level domain using the inverse EOTF 4B in order to map the non-linear signal value into display light to be displayed in format "b".

In order to process the non-linear data signals for converting from a first format "a" to a second format "b", implementation of color space and/or dynamic range conversions typically use 3-dimensional lookup tables ("3D LUTs") that are used extensively throughout the video and film industry. In certain implementations, a 3D LUT may be applied using computer software or using an FPGA (or similar digital logic device), for example.

FIG. 2 illustrates a block diagram of an image conversion system that uses a 3D LUT table for converting from a first image format to a second image format. As shown, the system receives input data (i.e., scene data) that is applied to a YUV to RGB converter 10. In general, YUV (or Y'UV) is an encoded color system (defined as a color space in terms of one luma component and two chrominance components). The YUV color model is converted to an RGB color model before being applied to an input transfer function 20 (e.g., OETF 2A of FIG. 1) to convert the RGB signal to non-linear signal values. In general, the input transfer function 20 will comprise a plurality of curves (one for each of the R, G, and B components), which are typically implemented as three separate 1D LUTs.

In order to perform the conversion from a first format to a second format, an image processor 30 or image processing component is configured to provide a number of conversion processes including tone mapping, gamut mapping, rendering intent and clipping. The processed signals are then applied to an output transfer function 40 (e.g., EOTF 4B of FIG. 1) and then converted from the RGB signals back to the YUV color space, which are then configured to be displayed (i.e., as display light) in the converted second format. In general, the output transfer function 40 will also comprise a plurality of curves (one for each of the R, G, and B components), which are typically implemented as three separate 1D LUT.

To execute the processing, the image conversion is implemented as a 3D LUT 60 that includes the input and output 1D LUTs and the image processor 30. During image format conversion, the 3D LUT 60 mixes all three RGB components, i.e., the processing of any given component depends upon the values of the other two components, such that there is an inter-dependence between them that cannot be represented exactly by separate 1D processing operations. For example, the rendering intent is a gain factor, which is a luminance to a power, since luminance is a function of R, G and B and thus requires a mixing all three. Also raising luminance to a power is a non-linear process, with the resulting rendering intent gain factor being applied to each of R, G and B, depending on the magnitude of the luminance.

The problem with using 3D LUT 60 for performing the image processing of the image format conversion is that the processing cost is usually significant and certain products (e.g., production switchers processing a high number of input/output video channels) cannot afford the processing resources to perform this consumption. For example, in existing designs, a 3D LUT for color space conversion is normally 17×17×17 or 33×33×33 in size. Moreover, the data can be, for example, 16-bits of precision, which would effectively generate a total of 33×33×33×16×3 or 1,724,976 bits of information. Yet further, the processing function represented by a third-party 3D LUT may be unknown (e.g., if it is external in origin, such as the BBC) and it is often undesirable or impractical to implement the read/interpolate functionality of a given 3D LUT.

Accordingly, what is needed is a system and method for performing the image format conversion by approximating the 3D LUT functionality to address the complexity and processing requirements of a 3D LUT.

SUMMARY OF THE INVENTION

Accordingly, a system and method is provided for image format conversion that is configured to match (at least within a tolerable threshold) the performance of a 3D LUT for HDR/SDR up, down or cross-conversions, using a simpler architecture that only uses 1D LUTs for the RGB components and a color conversion matrix, by modifying the shape of the 1D LUT curves and/or matrix elements. The disclosed configuration provides for a significant saving in the processing cost required for a 3D LUT.

According to an exemplary aspect, a system is provided for converting an image from a first image format to a second image format that approximates a three-dimensional lookup table. In this aspect, the system a three-dimensional lookup table (3D LUT) configured to mix R, G and B components of the image data in the first format to convert the image data to the second image format to generate a first converted signal; an image processor configured to execute a plurality of one-dimensional ("1D") processing input operations on the R, G and B components, respectively, a 3×3 matrix following the 1D processing input operations, and a plurality of 1D processing output operations after the 3×3 matrix, in order to convert the image data in the first format to the second format, with the 1D processing input and output operations comprising an image format conversion configuration having a plurality of variable parameters to generate a second converted signal; a difference calculator configured to calculate an error difference between the generated first converted signal and the generated second converted signal; and a curve calculator configured to receive the error difference and dynamically modify the plurality of variable parameters of the image format conversion configuration to obtain a minimal error difference. Moreover, the difference calculator is configured to compare the minimal error difference with a predetermined tolerance threshold to determine whether the image format conversion configuration with the modified plurality of variable parameters that generate the second converted signal that is an acceptable approximate of the first converted signal generated by the 3D LUT; and the difference calculator is configured to store the image format conversion configuration with the modified plurality of variable parameters in a 1D image processing operation database if the minimal error difference is within the predetermined tolerance threshold.

In an exemplary aspect, the first format is a high dynamic range (HDR) format and the second image format is a standard dynamic range (SDR).

In an exemplary aspect, the image processor is configured to perform an independent format conversion of each of the R, G and B components without mixing the R, G and B components a required by the 3D LUT to generate the first converted signal.

In an exemplary aspect, the curve calculator is configured to dynamically modify a shape of the 1D processing input operations by modifying the plurality of variable parameters.

In another exemplary aspect, a system is provided for converting image data from a first image format to a second image format that approximates a three-dimensional lookup table. In this aspect, the system includes a one-dimensional ("1D") image processing operation database configured to store a plurality of image format conversion configurations for converting a plurality of images in a plurality of first formats to a plurality of second formats; an image format conversion selector configured to select an image format conversion from a first format of the plurality of first formats to a second format of the plurality of second formats and to access, from the 1D image processing operation database, a corresponding image format conversion configuration for converting the image data to the second format; and an image processor configured to execute a plurality of 1D processing input operations on R, G and B components of the image data, respectively, a 3×3 matrix, and a plurality of 1D processing output operations on the respective R, G and B components, output from the 3×3 matrix, in order to convert the image data in the first format to the second format, with the 1D processing input and output operations comprising the accessed image format conversion configuration.

In an exemplary aspect, the system further includes a user interface configured to receive a user input selection for controlling the image format conversion selector to select the image format conversion configuration.

In an exemplary aspect, the image format conversion configuration is loaded dynamically to image processor for performing the 1D processing input and output operations.

In an exemplary aspect, the first format is a high dynamic range (HDR) format and the second image format is a standard dynamic range (SDR).

In an exemplary aspect, the image processor is configured to perform an independent format conversion of each of the R, G and B components without mixing the R, G and B components a required by a 3D LUT to generate a converted signal.

According to another exemplary aspect, a system is provided for converting image data from a first image format to a second image format that approximates a three-dimensional lookup table. In this aspect, the system includes an image processing operation database configured to store a plurality of image format conversion configurations for converting images in a plurality of first formats to a plurality of second formats; an image format conversion selector configured to select an image format conversion for converting the image data from a first format of the plurality of first formats to a second format of the plurality of second formats and to access, from the image processing operation database, a corresponding image format conversion configuration for converting the image data to the second format; and an image processor configured to execute a plurality of processing input operations on R, G and B components of the image data, a 3×3 matrix, and a plurality of processing output operations on the respective R, G and B components that are output from the 3×3 matrix, such that the image data is converted from the first format to the second format, with the processing input and output operations comprising the accessed image format conversion configuration.

In another exemplary aspect, the processing input operations comprise three separate one-dimensional ("1D") lookup tables ("LUTs") configured for processing the R, G and B components of the image data, respectively, with the 1D LUTs based on the accessed image format conversion configuration.

In another exemplary aspect, the processing output operations comprise three separate 1D LUT configured for processing the R, G and B components of the image data, respectively, output from the 3×3 matrix, with the 1D LUTs based on the accessed image format conversion configuration.

In another exemplary aspect, the 3×3 matrix is configured as an identity matrix.

In another exemplary aspect, the processing input and output operations are each separate transfer curves for each of the R, G and B components of the image data.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF DRAWINGS

The accompanying drawings, which are incorporated into and constitute a part of this specification, illustrate one or more example aspects of the present disclosure and, together with the detailed description, serve to explain their principles and implementations.

FIG. 7 illustrates an example of an image format conversion implemented by the system 300 for optimizing an image converter according to an exemplary aspect to approximate a three-dimensional lookup table for image format conversion.

DETAILED DESCRIPTION

Figure 1:
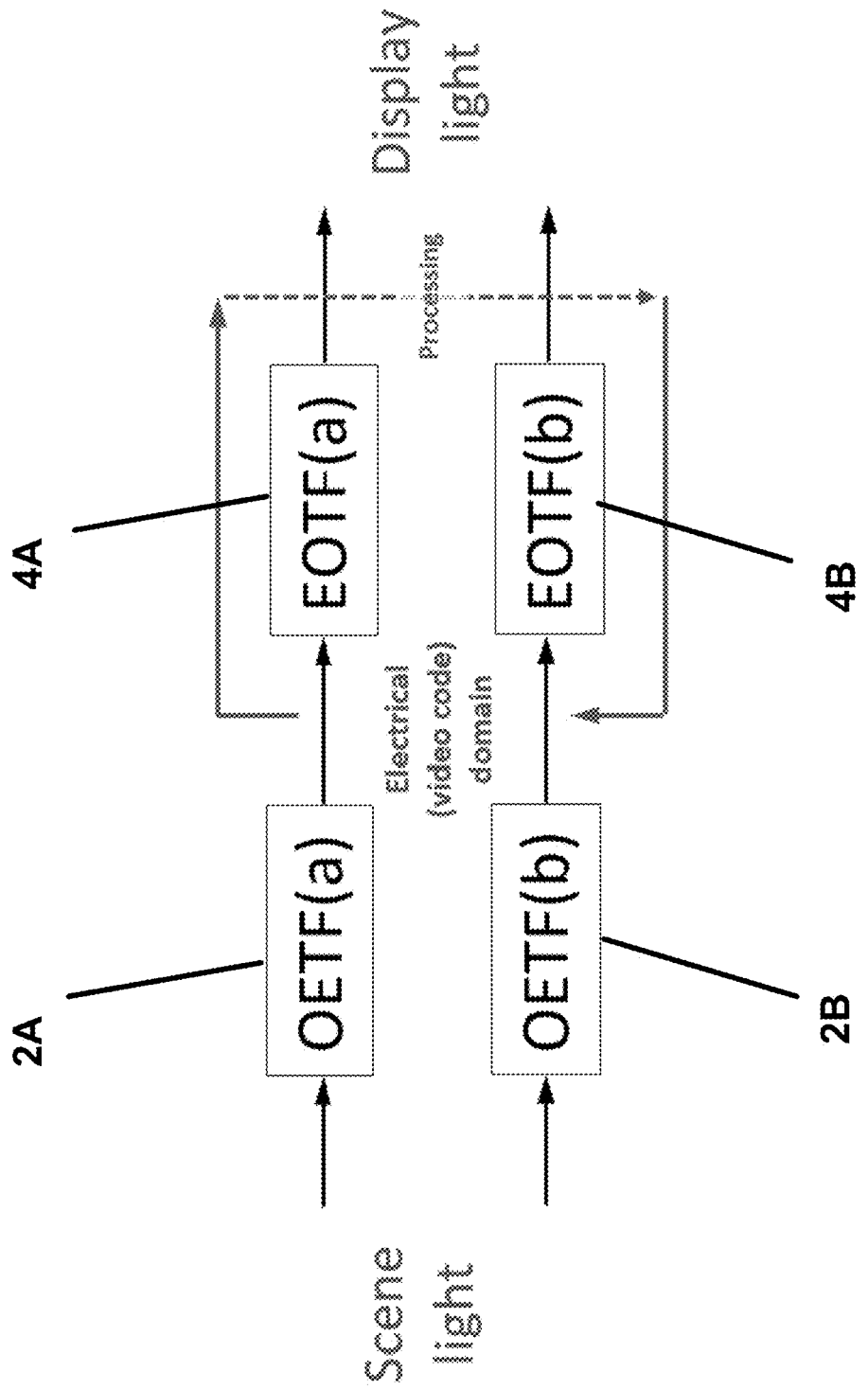
FIG. 1 illustrates a high-level block diagram of a conventional system for converting image data from a first format to a second format.
Figure 2:
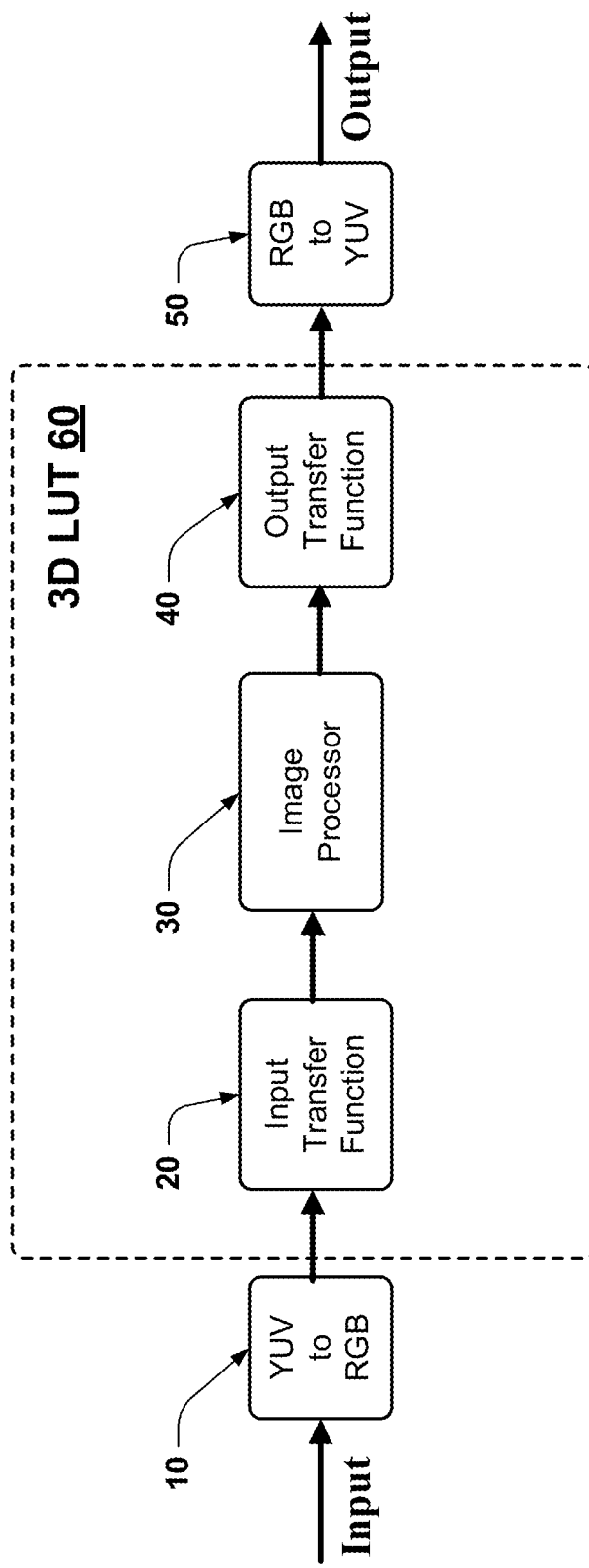
FIG. 2 illustrates a block diagram of a conventional image conversion system that uses a 3D LUT table for converting from a first image format to a second image format.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

The disclosed system and method will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more microprocessors. For example, one or more of the components of system 100, and, in particular, imaging processor 160, described below may provide for such processing system. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media may include transitory or non-transitory computer storage media for carrying or having computer-executable instructions or data structures stored thereon. Both transitory and non-transitory storage media may be any available media that can be accessed by a computer as part of the processing system. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

Figure 3:
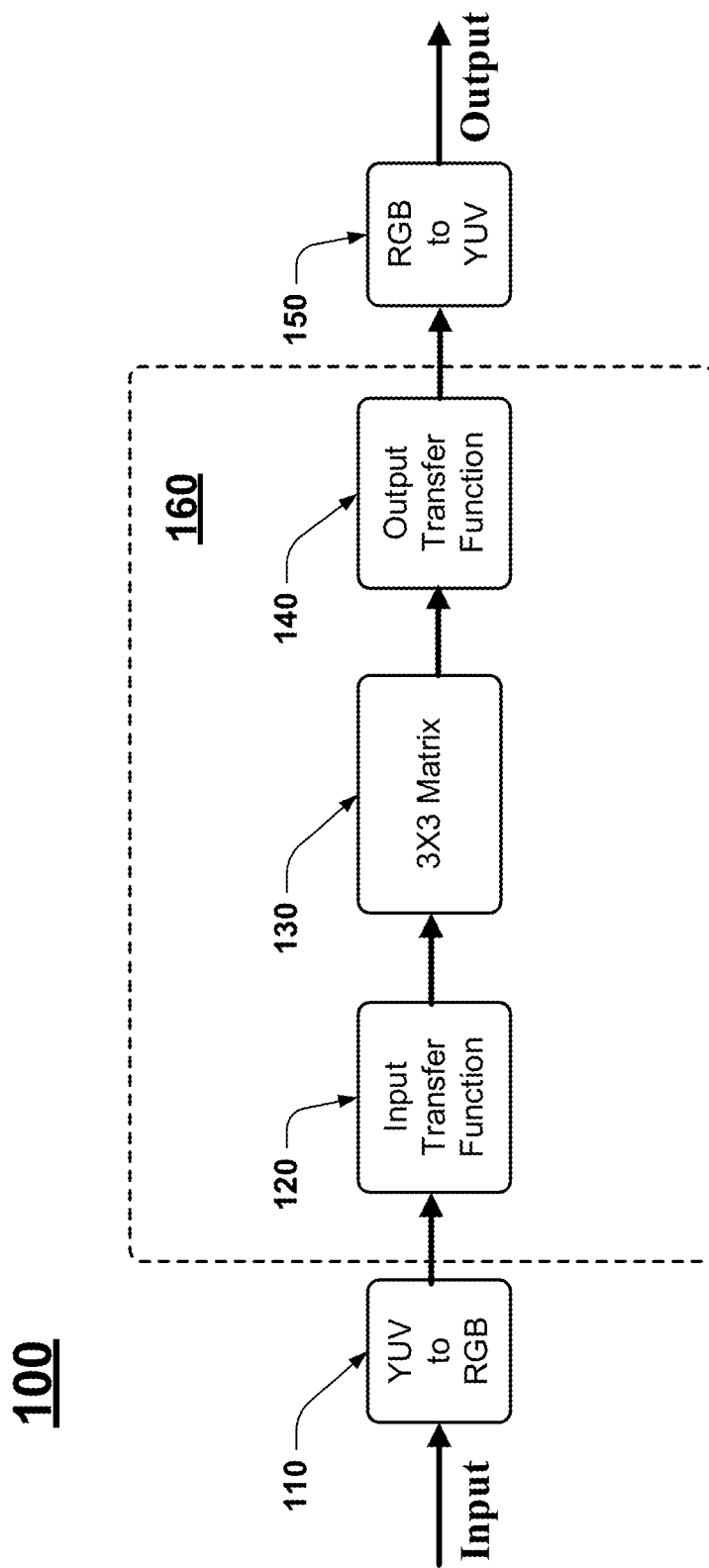
FIG. 3 illustrates a block diagram of an image converter according to an exemplary aspect that approximates a three-dimensional lookup table for image format conversion from a first image format to a second image format.

FIG. 3 illustrates a block diagram of an image converter 100 according to an exemplary aspect that approximates a three-dimensional lookup table for image format conversion from a first image format to a second image format. In general, the image converter 100 is configured to "approximate" a three-dimensional lookup table in that it executes an equivalent image format conversion (e.g., to generate acceptable image data in a same format as that would be generated by a conventional three-dimensional lookup table) without consuming the processing resources required by such a three-dimensional lookup table.

As shown, image converter 100 comprises an image processor 160 that is configured to convert "input" image data from a first format (e.g., high dynamic range) to a second format (e.g., standard dynamic range) to "output" display light that can be displayed on a content consuming device, for example. In an alternative aspect, the image converter 100 can be configured to generate image data from display light to scene light (e.g., SDR 709 to HLG). In either case, the image converter 100 can be implemented in a video production switcher, for example, that is configured to process hundreds of received input signals in various image formats and then output converted signals. In such an implementation, the image converter 100 will save significant compute resources of the video production switcher as discussed below.

As shown, system 100 includes a YUV to RGB converter 110 that is configured to convert the scene light in the YUV color space to RGB data, which is then fed into the image processor 160. The image processor 160 includes an input transfer function 120 that can comprise 3 separate 1D LUTs (one for each of R, G, and B) or three transfer curves (one for each of R, G, and B). In an exemplary aspect, the input transfer function 120 is defined by Recommendation ITU-R BT.2087-0 specification for the color conversion.

Rather than using a 3D LUT, the image processor 160 comprises a 3×3 matrix 130 (i.e., a color conversion matrix) that is configured to perform independent processing separately of each of the three red, green and blue components of the image signal output from the respective 1D LUTs of the input transfer function 120. By using the combination of the input transfer function 120, 3×3 matrix 130, and output transfer function 140 (discussed below) instead of a 3D LUT table, the image processor 160 is not required to mix the R, G and B components as part of the color conversion process, so that the image conversion process is significantly lower in terms of compute cost. That is, the color conversion process according to the exemplary aspect performs the color conversion without mixing the R, G and B components of the received image data.

As will be discussed in detail below, it should be appreciated that the image processor 160 (including input transfer function 120, 3×3 matrix 130, and output transfer function 140) cannot achieve an exact match as a system using a 3D LUT for the image conversion in all format conversions. However, given the constraints of this architecture, the system can be configured to approximate the properties of a given 3D LUT by modifying the shape of the 1D LUT curves and/or matrix elements (i.e., the functionality defined by the 3×3 matrix 130). Effectively, the image processor 160 provides a heuristic matching of a high-compute cost process with a lower compute-cost process that can be implemented in the HDR conversion domain, for example. By removing the 3D LUT processing, the system 100 is configured to perform an HDR to SDR conversion, for example, and significantly reduce hardware resource costs while providing higher signal throughput (i.e., more channels) compared with a conventional 3D LUT system.

As further shown, the output of the 3×3 matrix 130 of image processor 160 is then applied to an output transfer function 140, which again can comprise three separate 1D LUTs (one for each of R, G, and B) or three image conversion curves (one for each of R, G, and B). The output of the signal processed by the output transfer function 140 is converted from the individual RGB signals back to the YUV color space by YUV to RGB converter 150, which are then configured to be displayed (i.e., as display light) in the converted second format. Thus, if the image converter 100 is implemented in a video production switcher, the converted image can then be distributed by the video production switcher to a plurality of content consumption devices (e.g., televisions) as would be appreciated to one skilled in the art.

Figure 4:
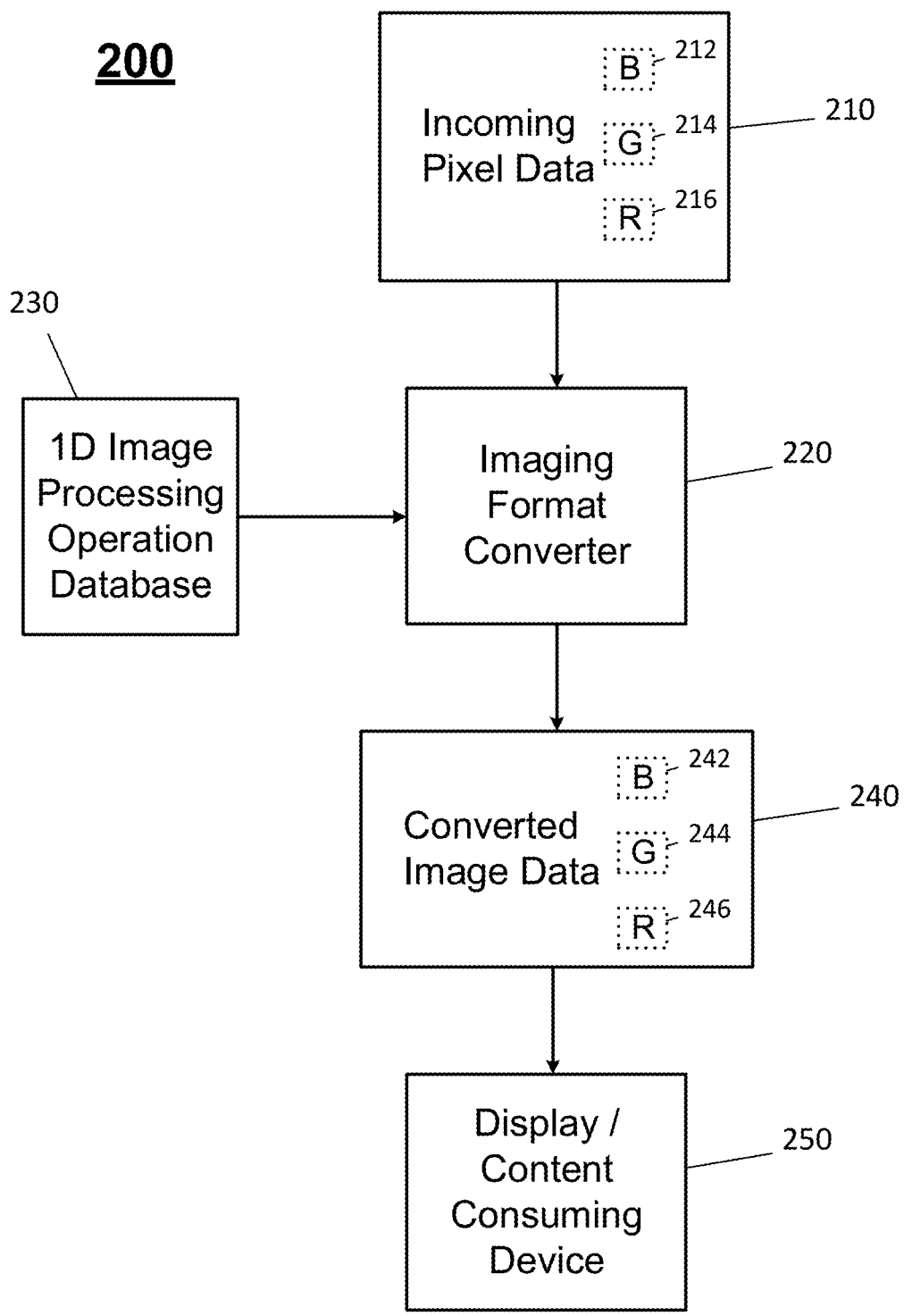
FIG. 4 illustrates another block diagram of an image conversion system including the image converter of FIG. 3 according to an exemplary aspect.

FIG. 4 illustrates another block diagram of an image conversion system 200 including the image converter of FIG. 3 according to an exemplary aspect. In general, it is noted that the imaging format converter 220 corresponds to the image processor 160 of the image converter 100 of FIG. 3 described above.

As shown, the imaging format converter 220 is configured to receive incoming pixel data 210 and convert the data between two imaging formats (e.g., color space and/or dynamic range models) utilizing the exemplary algorithms disclosed herein. According to the exemplary aspect, the incoming pixel data 210 includes RGB (blue 212, green 214, red 216) components in which each color component of each pixel may be formed by a plurality of bits, for example, each color component being a 10-bit value. Moreover, in an exemplary aspect, the incoming pixel data 210 can be generated by a camera, such as a video camera during live video production, that is configured to capture the image/pixel data of the video in a first format and transmit or transfer the captured pixel data as the incoming pixel data 210 to the imaging format converter 220. Alternatively or in addition thereto, the incoming pixel data 210 may be received as part of a data stream transmitted over a network (e.g., the Internet or a WiFi network) as would be appreciated to one skilled in the art. The generating of the pixel data 210 is not critical to the exemplary aspects of the current disclosure, but it should be appreciated that the pixel data is received in a first color space format having the RGB components according to the exemplary aspect.

As described above, the imaging format converter 220 is configured to perform independent processing separately of each of the three red, green and blue components (blue 212, green 214, red 216) of the image signal, in which the independent processing is configured to approximate the processing of a 3D LUT table, but without mixing the R, G and B components, so that the image conversion process is significantly lower in terms of compute cost.

As further shown, the imaging format converter 220 can be coupled to an 1D image processing operation database 230 (or more generally "an image processing operation database"). In this embodiment, the 1D image processing operation database 230 is configured to store a plurality of image conversion curves or the like (referred to as image format conversion configurations) for converting each of the red, green and blue components of the input data from a first format to a second format. As will also be discussed in more detail below, the system 200 can be calibrated for each of a plurality of conversion configurations, for example, PQ to SDR, HLG to SDR, SDR to HLG, and the like.

Figure 5:
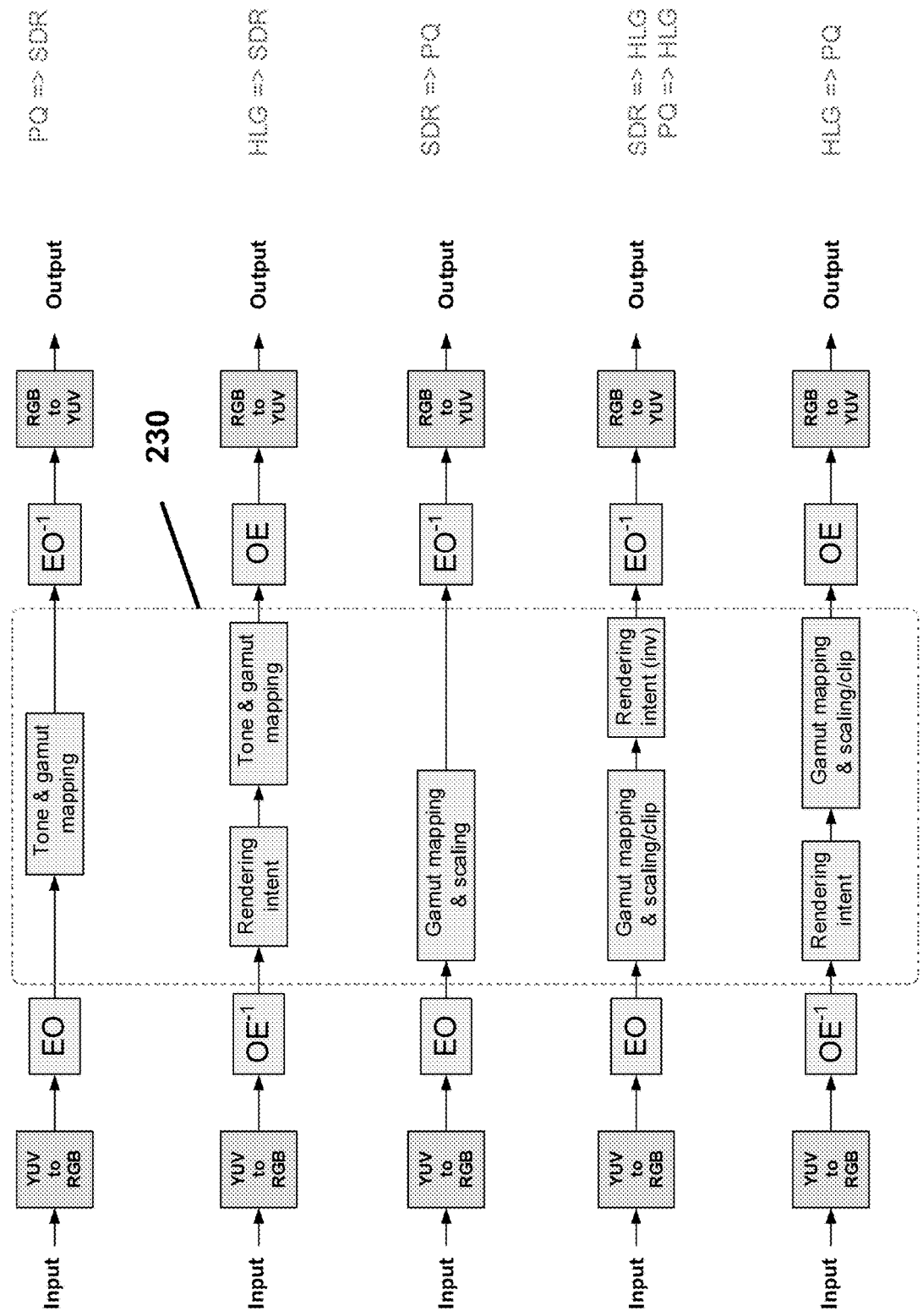
FIG. 5 illustrates exemplary flowcharts for a plurality of exemplary image format conversions that can be performed according to the exemplary system.

FIG. 5 illustrates exemplary flowcharts for a plurality of exemplary image format conversions that can be performed according to the exemplary system 100. As shown, the 1D image processing operation database 230 includes a plurality of format conversion configurations for performing the different conversions of the red, green and blue components for the various conversion from a first format to a second format. For example, conversion from PQ to SDR requires format conversion configurations (e.g., image conversion curves) for tone and gamut mapping. Similarly, conversion from HLG to SDR require format conversion configurations (e.g., image conversion curves) for rendering intent and also for tone and gamut mapping. Therefore, if a particular format conversion is selected by a user, the imaging format converter 220 can be configured to include an image format conversion selector that can access 1D image processing operation database 230 to access the corresponding image format conversion configurations stored therein. It is noted that the particular format conversions shown in FIG. 5 are provided as examples and that the invention is not limited to only those format conversions and corresponding format conversion configurations shown therein.

In any event, based on a pre-calibration procedure to optimize the conversion process, a plurality of image processing operations can be determined (or selected) by modifying variable format conversion parameters until an equivalent (or "good enough") approximation function is determined between the 1D image processing functionality and the conventional 3D LUT image conversion for each particular format conversion. Furthermore, each of these format conversion configurations can be stored in the 1D image processing operation database 230. During operation, a user can select the particular conversion to be performed on the input signal (e.g., by selecting an input to perform an HDR to SDR conversion). In turn, the image format converter 220 is configured to receive the user input selection and access the corresponding format conversion configurations from 1D image processing operation database 230. As noted above, these format conversion configurations can be image conversion curves for each of the red, green and blue components of the data (e.g., blue 212, green 214, red 216). Then, during operation, the image format converter 220 is configured to apply the appropriate format conversion configurations to perform the requested image conversion.

In an alternative aspect, these format conversion configurations can be hardwired or loaded dynamically into electronic memory if, for example, the image format converter 220, is implemented as part of a video production switcher the receives a plurality of outputs in a first plurality of formats and outputs a plurality of output signals in a second plurality of formats. In this case, each input port and/or output port of the video production switcher can be preselected or predesignated by the technician to utilize the appropriate format conversion configurations for converting the specific input signal (in a first format) to an output signal (in a second format).

In any event, as further shown in FIG. 4A, the imaging format converter 220 is configured to output converted image data 240 for each incoming pixel data 210 after conversion using the exemplary conversion techniques/algorithms described herein. Similar to the incoming pixel data 210, the converted image data 240 will include BGR components (blue 242, green 244, red 246). Thus, the converted image data 240 may be output in a second imaging format (e.g., SDR format) where it is transmitted to a display device 250 for display thereon. It should be appreciated that the display device 250 can be any type of display device (e.g., television, computer monitor, video production equipment, viewfinder or the like) for consuming content in the second imaging format and is in no way limited, except that the display (content consuming) device 250 is configured to display the converted image data 240 in the converted image format, such as SDR content, for example. In another exemplary aspect, the converted image data can be stored in a media file, for example, to be subsequently displayed on an image consumption device.

It should also be appreciated that the imaging format conversion can be provided for multiple types of imaging format conversion as described above. For example, the imaging format converter 220 can be configured to change video colorspace, HDR, gain, hue, and the like, or any combination of these functions. Moreover, the imaging format converter 220 can also be used, for example, for YUV, but also for YCbCr, YPbPr and the like, in another exemplary aspect.

Figure 6:
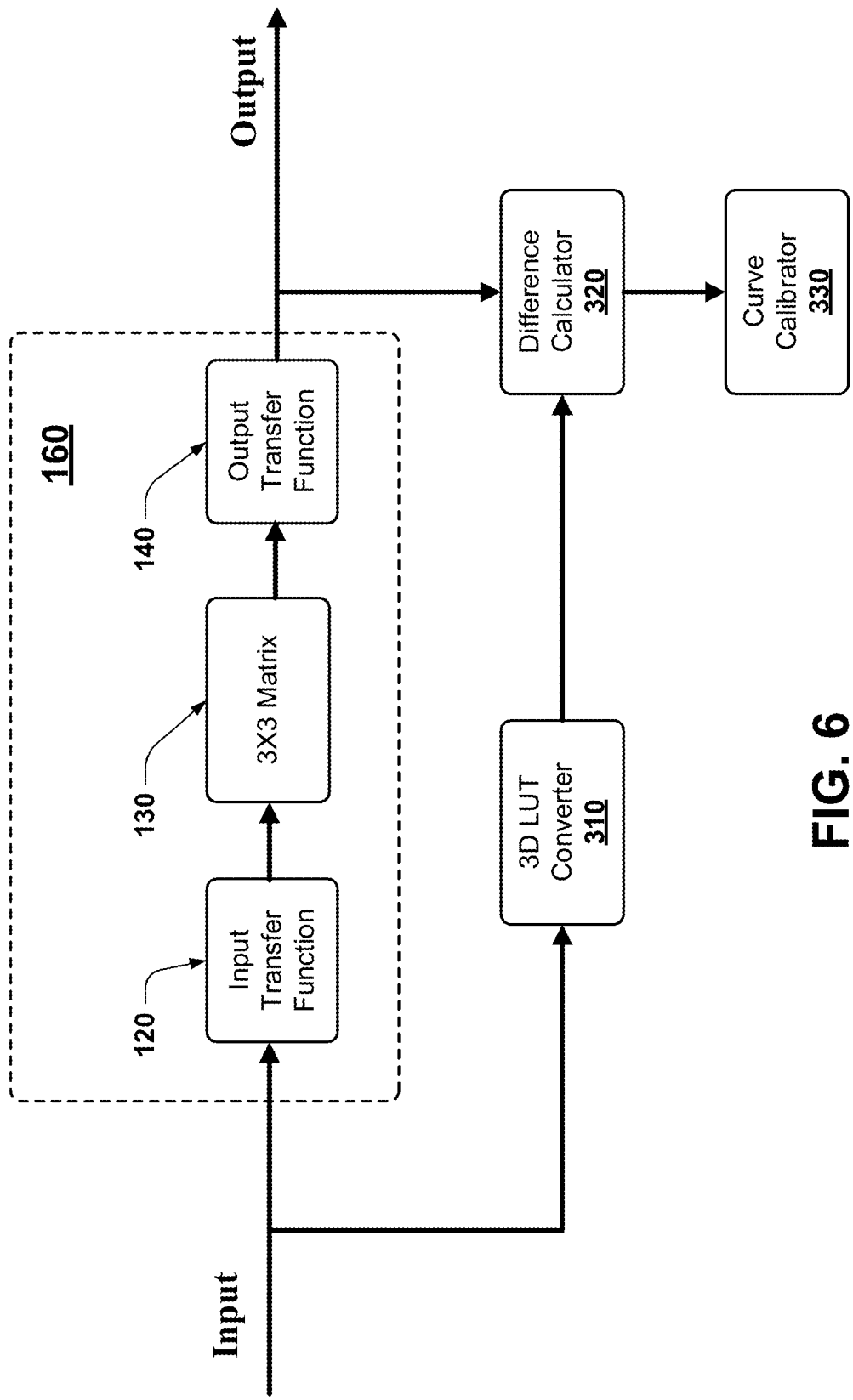
FIG. 6 illustrates a block diagram of system for optimizing an image converter according to an exemplary aspect to approximate a three-dimensional lookup table for image format conversion.

FIG. 6 illustrates a block diagram of system 300 for optimizing an image converter according to an exemplary aspect to approximate a three-dimensional lookup table for image format conversion. As shown, system 300 includes the imaging processor 160 described above with respect to FIG. 3 that includes input transfer function 120, 3×3 color conversion matrix 130 and output transfer function 140. The configuration and functionality of these components is the same as that described above with respect to FIG. 1. As such, the details of these components will not be repeated.

According to the exemplary embodiment in FIG. 6, the system 300 is configured to approximate the 3D LUTs with 1D LUTs and the 3×3 matrix as described herein. More particularly, the system 300 is configured to tune variable parameters for the curve/matrix that optimize the format conversion configurations for each type of image format conversion (e.g., HDR to SDR conversion). To do so, the system 300 includes a conventional 3D LUT image converter 310 that converts the RGB image data from a selected first image format to a second image format by mixing all three RGB components non-linearly, as described above. In turn, a difference calculator 320 is configured to compare the output data of image processor 160 with the corresponding output data of 3D LUT converter 310. In one refinement of the exemplary aspect, the difference calculator 320 can further compare the difference data with a predetermined tolerance threshold to determine if the output data from the image processor 160 is within an acceptable threshold (e.g., if it is an acceptable equivalent) of the output data of 3D LUT converter 310. In other words, if the calculated difference is within or below the predetermined tolerance threshold, the difference calculator 320 confirms that the current format conversion configuration for the selected format conversion (e.g., HDR to SDR) is an acceptable equivalent of the 3D LUT. As a result, the current format conversion configurations can be stored in the 1D image processing operation database 230 (as described above) for that specific image format conversion. However, if the difference output is not within the acceptable tolerance threshold, a curve calibrator 330 is provided and configured to modify the variable parameters of the current format conversion configuration, i.e., as a feedback loop to determine the optimal variable parameters for the given image format conversion. That is, the variable parameters can be adjusted to modify the format conversion configuration for converting the image data until the resulting convert image data falls within the acceptable tolerance threshold (e.g., within 10% of the output data of 3D LUT converter 310)

FIG. 7 illustrates an example of an image format conversion implemented by the system 300 for optimizing an image converter according to an exemplary aspect to approximate a three-dimensional lookup table for image format conversion. As shown, α, $gain_{in}$, β and $gain_{out}$, are numerical parameters that can be dynamically modified to optimize the image format conversion. For example, the input LUT and output LUT can be implemented as standard curves in an exemplary aspect. In an exemplary aspect, for Hybrid Log Gamma ("HLG") inputs, the standardized input transfer function (OETF) is defined by the ITU-R BT.2100 specification. The same specification document also gives the standardized output transfer function (EOTF) for Perceptual Quantizer (PQ) outputs. Other specifications are published in similar documents (e.g. ITU-R BT709, ITU-R BT601, ITU-R BT1886 and SMPTE ST2084). Moreover, the color conversion 3×3 matrix can also be implemented for standard color conversion, for example, it can be implemented as an identity matrix (i.e., a unit matrix), which is known as a simple square matrix with ones on the main diagonal and zeroes elsewhere. Other examples can include BT709 to BT2020 color conversion, which is standardized in ITU-R BT.2087 and conversion the other way around is specified in the ITU recommendation ITU-R BT.2407, for example.

Referring back to FIG. 6, during calibration, the curve calibrator 330 is configured to dynamically modify the numerical parameters to adjust the image format conversion that is currently being tested. To do so, the curve calibrator 330 in conjunction with the difference calculator 320 is configured as a feedback loop in which the curve calibrator 330 continuously modifies the variable parameters α, $gain_{in}$, β and $gain_{out}$ to minimize the difference between the output of the image processor 160 and the 3D LUT converter 310. Once the error difference is minimized and also within the tolerance threshold (as discussed above), the variable parameters α, $gain_{in}$, β and $gain_{out}$ will be selected for the current image format conversion and then saved in 1D image processing operation database 230 to be accessed during implementation of image converter 100.

Figure 8:
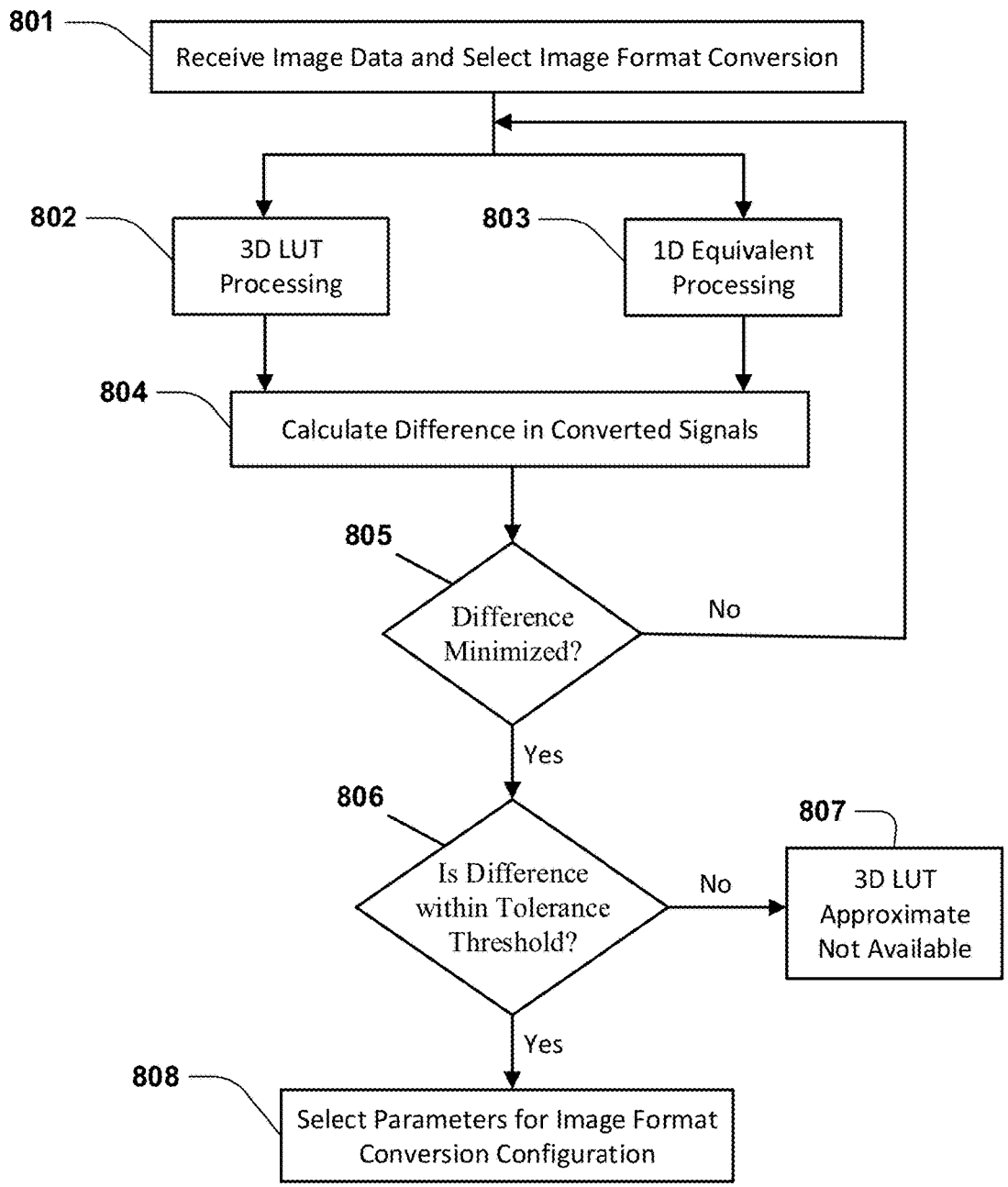
FIG. 8 illustrates a flowchart for a method for optimizing an image converter according to an exemplary aspect to approximate a three-dimensional lookup table for image format conversion.

FIG. 8 illustrates a flowchart for a method 800 for optimizing an image converter according to an exemplary aspect to approximate a three-dimensional lookup table for image format conversion. In general, it should be appreciated that the exemplary method 800 can be implemented using the system 300 as described above with respect to FIG. 6.

As shown, image data (e.g., red, green and blue pixel data) is received and an image format conversion (e.g., HDR to SDR) is selected at step 801. By selecting a specific image format conversion, an initial image format conversion configurations with the variable parameters α, $gain_{in}$, β and $gain_{out}$ is also selected for the 1D image format conversion configured (e.g., as shown in FIG. 7). At steps 802 and 803, the 3D LUT processing and 1D equivalent processing (using the initial image format conversion configurations) are executed in parallel to perform respective image format conversions of the received image data, in order to generate a first converted image and a second converted image.

Next, at step 804, a difference between the processed image data (i.e., the first converted image and the second converted image) is calculated by difference calculator 320, for example. At step 805, the curve calibrator 330 with the difference calculator 320 (as a feedback loop) then determines whether this calculated difference is minimized (i.e., whether it is the optimal image format conversion configuration). It is noted that the difference can be measured in multiple techniques, including, for example: average RGB difference; maximum RGB difference RGB errors weighted (e.g., by luminance); hue difference in which both sets of RGB values are converted into HSV space and the hue difference is measured; and difference in ICtCp color space in which both sets of RGB values are converted into ICtCp space and the difference is measured after such conversion. In any event, it should be appreciated that these are exemplary aspects of who the error differences can be measured in implement.

In addition, minimizing the calculated differences is performed by dynamically modifying the variable parameters α, $gain_{in}$, β and $gain_{out}$ to minimize the difference error. Once the parameters are determined to achieve a minimal difference between the two converted image signals, the difference calculator 320 further compares the calculator difference with a tolerance threshold (which can be a predetermined error threshold) at step 806, which is predetermined and configured to confirm whether the image format conversion configurations for the 1D image format conversion provides a converted image that is an acceptable equivalent of the 3D LUT conversion. If so, the current image format conversion configuration is selected and stored in the 1D image processing operation database 230 to be implemented for actual image format conversion for system 100, for example. Otherwise, in some instances, there may not be image format conversion configurations that create an acceptable equivalent to the 3D LUT processing (i.e., if the calculated error difference is not within the tolerance threshold). In this instance, the method proceeds to step 807 to confirm that no equivalent to the 3D LUT is available for the current image format conversion being calibrated.

By using the above-described systems and method, the exemplary embodiments are configured to approximate a non-linear 3D processing operation on RGB pixel values by non-linear 1D processing operations on the R, G and B components individually. Specifically, applying the exemplary system and methods to HDR conversion eliminates the computationally costly rendering intent and/or tone mapping computations of the image format conversion process.

Figure 9:
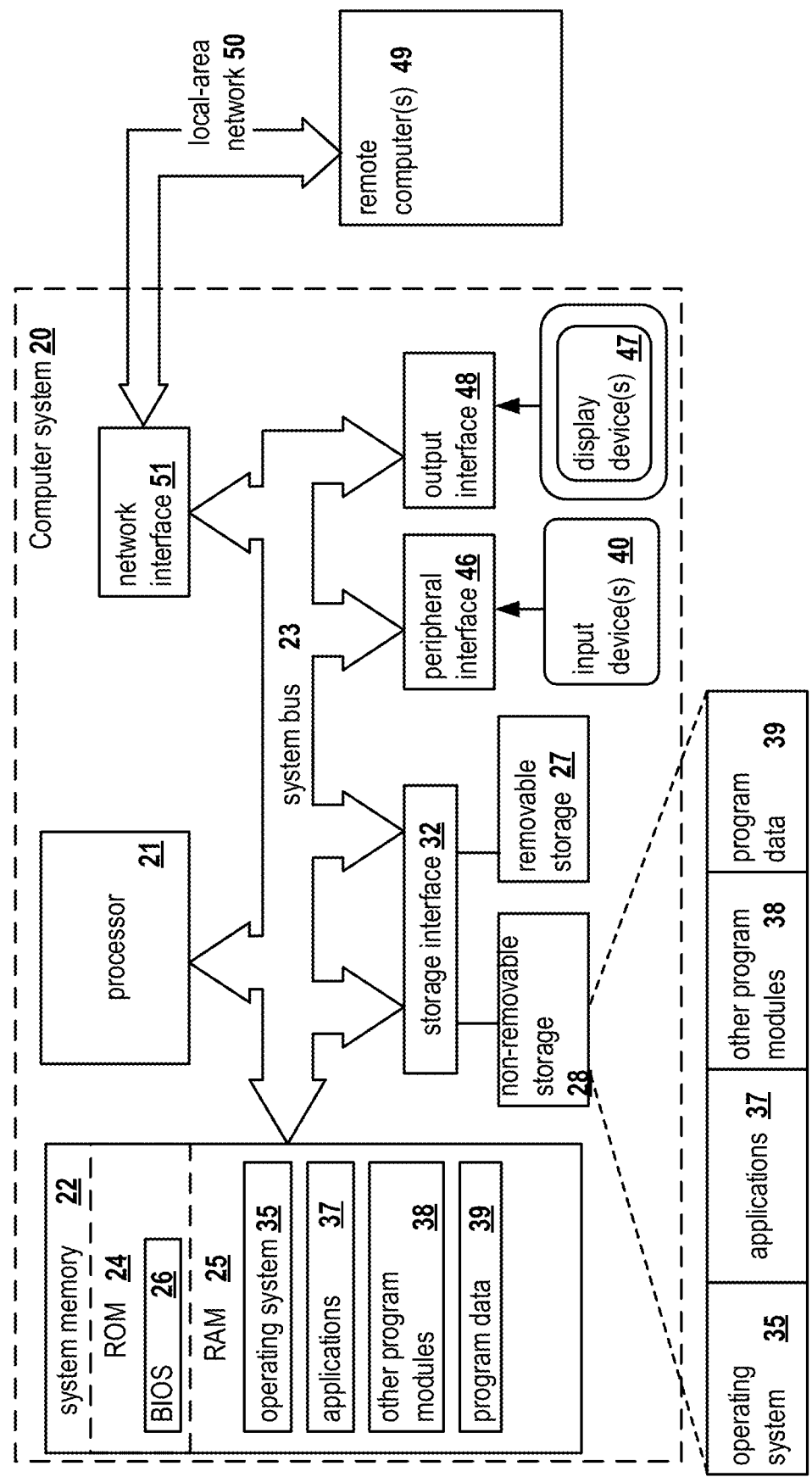
FIG. 9 is a block diagram illustrating a computer system on which aspects of systems and methods can be implemented for approximating a three-dimensional lookup table for image format conversion.

FIG. 9 is a block diagram illustrating a computer system on which aspects of systems and methods can be implemented for approximating a three-dimensional lookup table for image format conversion. It should be noted that the computer system 20 can correspond to any computing system configured to execute the image conversion systems 100 and 200 and/or the image conversion calibration system 300 and/or or any components therein, as described above. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20. It should be appreciated that in one exemplary aspect, the one or more removable storage devices 27 can correspond to 1D image processing operation database 230.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet (e.g., Internet 103). Examples of the network interface 51 may include an Ethernet interface, a Frame Relay interface, SONET interface, and wireless interfaces.

In general, it is noted that the exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for optimizing an image converter to approximate a three-dimensional lookup table for converting image data from a first image format to a second image format, the system comprising:
   a three-dimensional lookup table (3D LUT) configured to mix R, G and B components of the image data in the first format to convert the image data to the second image format to generate a first converted signal;
   an image processor configured to execute a plurality of one-dimensional ("1D") processing input operations on the R, G and B components, respectively, a 3×3 matrix following the 1D processing input operations, and a plurality of 1D processing output operations after the 3×3 matrix, in order to convert the image data in the first format to the second format, with the 1D processing input and output operations comprising an image format conversion configuration having a plurality of variable parameters to generate a second converted signal;
   a difference calculator configured to calculate an error difference between the generated first converted signal and the generated second converted signal;
   a curve calculator configured to receive the error difference and dynamically modify the plurality of variable parameters of the image format conversion configuration to obtain a minimal error difference;
   wherein the difference calculator is configured to compare the minimal error difference with a predetermined tolerance threshold to determine whether the image format conversion configuration with the modified plurality of variable parameters that generate the second converted signal that is an acceptable approximate of the first converted signal generated by the 3D LUT;
   wherein the difference calculator is configured to store the image format conversion configuration with the modified plurality of variable parameters in a 1D image processing operation database if the minimal error difference is within the predetermined tolerance threshold.

2. The system according to claim 1, wherein the first format is a high dynamic range (HDR) format and the second image format is a standard dynamic range (SDR).

3. The system according to claim 1, wherein the image processor is configured to perform an independent format conversion of each of the R, G and B components without mixing the R, G and B components as required by the 3D LUT to generate the first converted signal.

4. The system according to claim 1, wherein the curve calculator is configured to dynamically modify a shape of the 1D processing input operations by modifying the plurality of variable parameters.

5. A system for converting image data from a first image format to a second image format that approximates a three-dimensional lookup table, the system comprising:
   a one-dimensional ("1D") image processing operation database configured to store a plurality of image format conversion configurations for converting a plurality of images in a plurality of first formats to a plurality of second formats;
   an image format conversion selector configured to select an image format conversion from a first format of the plurality of first formats to a second format of the plurality of second formats, and further configured to access, from the 1D image processing operation database, a corresponding image format conversion configuration for converting the image data to the second format; and
   an image processor configured to execute a plurality of 1D processing input operations on R, G and B components of the image data, respectively, a 3×3 matrix, and a plurality of 1D processing output operations on the respective R, G and B components, output from the 3×3 matrix, in order to convert the image data in the first format to the second format,
   wherein the 1D processing input and 1D processing output operations are based on the image format conversion configuration accessed by the image format conversion selector.

6. The system according to claim 5, further comprising a user interface configured to receive a user input selection for controlling the image format conversion selector to select the image format conversion configuration.

7. The system according to claim 5, wherein the image format conversion configuration is loaded dynamically to the image processor for performing the 1D processing input and 1D processing output operations.

8. The system according to claim 5, wherein the first format is a high dynamic range (HDR) format and the second image format is a standard dynamic range (SDR).

9. The system according to claim 5, wherein the image processor is configured to perform an independent format conversion of each of the R, G and B components without mixing the R, G and B components a required by a 3D LUT to generate a converted signal.

10. A system for converting image data from a first image format to a second image format that approximates a three-dimensional lookup table, the system comprising:
- an image processing operation database configured to store a plurality of image format conversion configurations for converting images in a plurality of first formats to a plurality of second formats;
- an image format conversion selector configured to select an image format conversion for converting the image data from a first format of the plurality of first formats to a second format of the plurality of second formats, and further configured to access, from the image processing operation database, a corresponding image format conversion configuration for converting the image data to the second format; and
- an image processor configured to execute a plurality of processing input operations on R, G and B components of the image data, a 3×3 matrix, and a plurality of processing output operations on the respective R, G and B components that are output from the 3×3 matrix, such that the image data is converted from the first format to the second format,
- wherein the processing input and output operations are based on the image format conversion configuration accessed by the image format conversion selector.

11. The system according to claim 10, wherein the processing input operations comprise three separate one-dimensional ("1D") lookup tables ("LUTs") configured for processing the R, G and B components of the image data, respectively, with the 1D LUTs based on the accessed image format conversion configuration.

12. The system according to claim 11, wherein the processing output operations comprise three separate 1D LUT configured for processing the R, G and B components of the image data, respectively, output from the 3×3 matrix, with the 1D LUTs based on the accessed image format conversion configuration.

13. The system according to claim 12, wherein the 3×3 matrix is configured as an identity matrix.

14. The system according to claim 10, wherein the processing input and output operations are each separate transfer curves for each of the R, G and B components of the image data.

15. The system according to claim 10, further comprising a user interface configured to receive a user input selection for controlling the image format conversion selector to select the image format conversion configuration.

16. The system according to claim 15, wherein the image format conversion configuration is loaded dynamically to the image processor for performing the processing input and output operations.

17. The system according to claim 10, wherein the first format is a high dynamic range (HDR) format and the second image format is a standard dynamic range (SDR).

18. The system according to claim 10, wherein the image processor is configured to perform an independent format conversion of each of the R, G and B components without mixing the R, G and B components a required by a 3D LUT to generate a converted signal.

* * * * *